United States Patent
Sirbu et al.

(10) Patent No.: US 9,384,337 B1
(45) Date of Patent: Jul. 5, 2016

(54) ITEM SHARING BASED ON INFORMATION BOUNDARY AND ACCESS CONTROL LIST SETTINGS

(71) Applicant: Microsoft Technology Licensing, LLC, Redmond, WA (US)

(72) Inventors: Alin Sirbu, Seattle, WA (US); John Lincoln DeMaris, Seattle, WA (US); Mary David Pasch, Seattle, WA (US); Zachary Shallcross, Bothell, WA (US); Alexandru Burst, Kirkland, WA (US); Steve Rayson, Redmond, WA (US); Michael Van Waardhuizen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/697,540

(22) Filed: Apr. 27, 2015

(51) Int. Cl.
*G06F 17/30* (2006.01)
*G06F 21/31* (2013.01)

(52) U.S. Cl.
CPC .......... *G06F 21/31* (2013.01); *G06F 17/30165* (2013.01)

(58) Field of Classification Search
None
See application file for complete search history.

(56) References Cited

U.S. PATENT DOCUMENTS

| | | | |
|---|---|---|---|
| 6,999,962 B2 | 2/2006 | Julliard et al. | |
| 7,136,903 B1 | 11/2006 | Phillips et al. | |
| 7,281,049 B2 | 10/2007 | Verma et al. | |
| 7,984,512 B2 | 7/2011 | Flaks et al. | |
| 8,438,185 B2 | 5/2013 | Teranishi et al. | |
| 2002/0147929 A1 | 10/2002 | Rose | |
| 2004/0249902 A1 | 12/2004 | Tadayon et al. | |
| 2008/0189617 A1 | 8/2008 | Covell et al. | |
| 2010/0325686 A1 | 12/2010 | Davis et al. | |
| 2011/0035503 A1 | 2/2011 | Zaid et al. | |
| 2011/0162040 A1 | 6/2011 | Stephens | |
| 2012/0331108 A1 | 12/2012 | Ferdowsi et al. | |
| 2013/0067594 A1* | 3/2013 | Kantor et al. | 726/28 |
| 2013/0290256 A1 | 10/2013 | Barrall et al. | |
| 2014/0032672 A1* | 1/2014 | Yoshikawa | H04L 67/18 709/204 |
| 2014/0067865 A1* | 3/2014 | Kirigin | 707/783 |
| 2014/0165176 A1* | 6/2014 | Ow | 726/8 |
| 2015/0199533 A1* | 7/2015 | Chou Fritz | G06F 21/6218 707/785 |

OTHER PUBLICATIONS

How to Share and Set Permissions for Folders and Files Using Windows XP, Microsoft Technet, Published: Nov. 6, 2001.*
Permission Precedence, NTFS.com webpage, https://web.archive.org/web/20120929005601/http://www.ntfs.com/ntfs-permissions-precedence.htm archived on waybackmachine on Sep. 29, 2012.*

(Continued)

*Primary Examiner* — Jay Morrison
(74) *Attorney, Agent, or Firm* — Julie Kane Akhter; Raghu Chinagudabha; Micky Minhas

(57) ABSTRACT

An item is shared based on an information boundary and access control settings. An application such as a document management application detects a selection of an information boundary to manage a sharing action associated with the item. The information boundary includes rules to define how the item is shared. A selection of an access control list is also detected to manage recipients who have an access to the item. The access control list allows a recipient in the list an ability to search and discover the item. In response to a detection of the sharing action to share the item, the information boundary and the access control list is applied to the item. The item is then shared based on the information boundary and the access control list through a link of the item transmitted to a recipient.

19 Claims, 8 Drawing Sheets

(56) References Cited

OTHER PUBLICATIONS

Find Items Faster with Windows Search and Libraries—The Windows Server Essentials and Small Business Server Blog, by SBS Bloggers, Apr. 5, 2010.*

William von Hagen, "Ubuntu® Linux® Bible: Featuring Ubuntu 10.04 LTS, Third Edition", Publisher: John Wiley & Sons, Publication Date: Jun. 1, 2010, ISBN: 978-0-470-60450-2, pp. 393-394.*

Whalen, et al., "File Sharing and Group Information Management", In Proceedings of Personal Information Management, Apr. 5, 2008, 8 pages.

Smetters, et al., "How Users Use Access Control", In Proceedings of Symposium on Usable Privacy and Security, Jul. 15, 2009, 12 pages.

Wolber, Andy., "Quick Tip: Sharing Google Drive documents is now a bit easier", Published on: Oct. 8, 2013 Available at: http://www.techrepublic.com/blog/google-in-the-enterprise/quick-tip-sharing-google-drive-documents-is-now-a-bit-easier/.

"Share documents or folders in Office 365", Retrieved on: Mar. 20, 2015 Available at: https://support.office.com/en-in/article/Share-documents-or-folders-in-Office-365-1fe37332-0f9a-4719-970e-d2578da4941c.

* cited by examiner

ITEM SHARING BASED ON INFORMATION BOUNDARY AND ACCESS CONTROL LIST SETTINGS

BACKGROUND

When working with files stored in file management solutions (like cloud drives), a file owner may share a link to one of his or her files with somebody else to allow them to open that file. The recipients of the link may want to forward the link to others further sharing the file. For some files that are shared, the document owner may trust the people he or she shares with to share content only with people who need access to that information. Therefore, to allow for friction-free collaboration within a working group, the document owner may want to allow any second-order recipients access the file through the shared link. The document may be accessed through the shared link without having to approve every new person accessing the file, or having to specify in advance individuals who should be granted access.

However, in an organizational environment, friction-free collaboration may need be balanced with information security requirements of the organization. File owners may want/need to specify boundaries that define how far a piece of content might be re-shared.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to sharing an item based on information boundary and access control list settings. An application such as an item management application may detect a selection of an information boundary. The information boundary may be used to manage a sharing action associated with an item. The item may include a document, an audio file, a video file, or presentation, among others. A selection of an access control list may also be detected. The access control list may be used to manage recipients who have an access to the item.

A sharing action to share the item may be detected. The sharing action may include a transmission of a link of the item to a recipient. Furthermore, the information boundary and the access control list may be applied to the item. The information boundary may include rules to grant access to the item that may be applied to the item. The recipient may be added to the access control list associated with the item to allow the recipient to search and discover the item. The item may be shared based on the information boundary and the access control list.

These and other features and advantages will be apparent from a reading of the following detailed description and a review of the associated drawings. It is to be understood that both the foregoing general description and the following detailed description are explanatory and do not restrict aspects as claimed.

GLOSSARY

Figure 1:
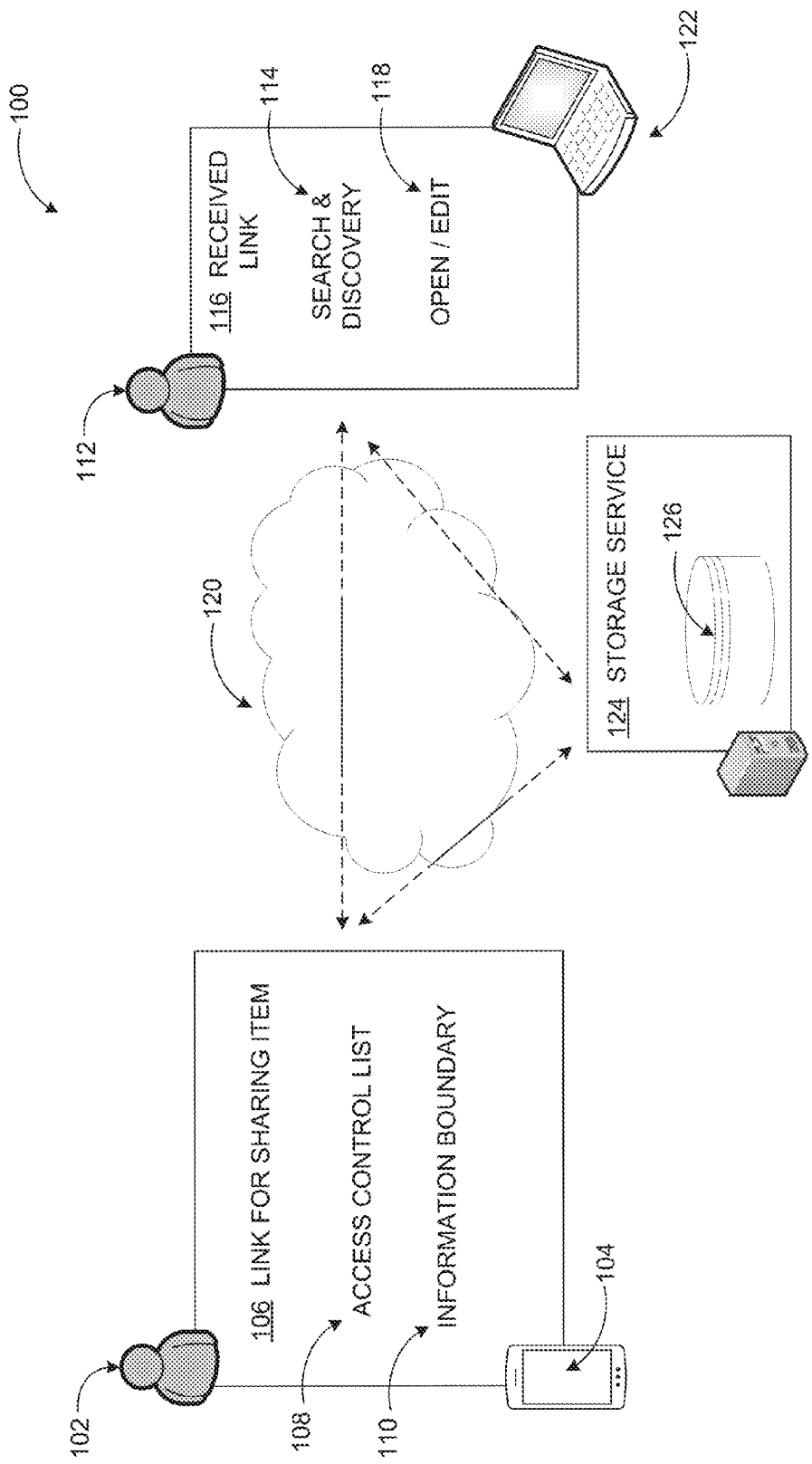
FIG. 1 includes an example network environment where item sharing based on information boundary and access control list settings may be implemented.

Item—any form of structured data and streaming data that includes documents, files, and folders. Files may contain textual, graphical, audio, video, and similar data.

Sharer—a user sharing an item with one or more other users based on information boundary and access control parameters or rules.

Item Management Application—an application that enables management of items such as saving, opening, editing, sharing. An example item management application may be a document management application, but applications that allow editing and creation of content such as word processing applications or spreadsheet applications may also be empowered with item management capabilities such as sharing of documents from within a presentation application user experience.

Collaborative Service—a set of coordinated applications and associated cloud storage hosted by a plurality of servers providing access to the functionality of the applications and collaboration opportunities through web browser or locally installed client application user experiences to a plurality of users. The collaborative service may provide its services to "clients" or "tenants", who in turn may allow users or subscribers to access the provided services. An item management application may be part of a collaborative service or work in conjunction with a collaborative service.

Cloud storage—one or more data stores accessible through networks.

Permission level—a security setting that enables a user to control access to the shared items within a data storage.

Computing device—a device comprising at least a memory and a processor that includes a desktop computer, a laptop computer, a tablet computer, a smart phone, a vehicle mount computer, or a wearable computer.

Memory—a removable or non-removable component of a computing device configured to store one or more instructions to be executed by one or more processors.

A processor—a component of a computing device coupled to a memory and configured to execute programs in conjunction with instructions stored by the memory.

File—any form of structured data that is associated with audio, video, graphics, images, and text.

Third party service—an independent service separate from a system used by the initiating user and the target user, another service, or an application.

Operating system—a system configured to manage hardware and software components of a computing device that provides common services and applications.

Integrated module—a component of an application or service that is integrated within the application or service such that the application or service is configured to execute the component.

Application—a program that when executed enables a user to communicate, create, edit, and share items.

Computer-readable memory device—a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location.

User experience—a visual display associated with an application or service through which a user interacts with the application or service.

User action—an interaction between a user and a user experience of an application or a user experience provided by a service that includes one of touch input, gesture input, voice command, eye tracking, gyroscopic input, pen input, mouse input, and keyboards input.

Application programming interface (API)—a set of routines, protocols, and tools for an application or service that enable the application or service to interact or communicate with one or more other applications and services managed by separate entities.

Information boundary—a set of rules to govern how an item may be shared with other users within one or more organizational entities. Example access rules may pertain to search, discovery, read access, write access, execute access, and similar actions.

Access Control List—a list of rules governing who can have what type of access to an item within one or more organizational entities. Access Control Lists may be defined/modified by administrators or users and relate to level of access to shared items by users of different attributes.

DETAILED DESCRIPTION

As briefly described above, an item such as a document, a video file, an audio file, and a presentation, among others may be shared based on information boundary and access control list settings. A selection of an information boundary may be detected to manage a sharing action associated with the item. A selection of an access control list may also be detected to manage recipients who have an access to the item. In response to a detection of the sharing action to share the item, the information boundary and the access control list may be applied to the item. The item may be shared based on the information boundary and the access control list.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to share an item based on information boundary and access control list settings. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where item sharing based on information boundary and access control list settings may be implemented. As shown in diagram 100, a sharer 102 may transmit a link for sharing an item 106 through a computing device 104. The computing device 104 may include a mobile device such as a smart phone, and a notebook computer, among others.

The item to be shared may be managed through settings that include an access control list 108 and an information boundary 110. The access control list 108 may include a list of recipients who have an access to the item. The access control list 108 may be updated through a permission control system that manages users and permissions within an organization. An administrator may be allowed to add or remove recipients from a recipient data store from which the access control list 108 may be generated. The sharer 102 may be allowed to select recipients from the recipient data store to generate the access control list 108 to generate the access control list 108. A recipient 112 who is in the access control list 108 may be allowed to search and discover the item to be shared.

The information boundary 110 may include a set of rules to govern how the item may be shared. In an example scenario access rules such as a read access rule, a write access rule, and an execute access rule, among other rules may be defined in the information boundary 110. A group of recipients may also be identified in the information boundary 110. In another example scenario, the sharer 102 may identify in the information boundary 110 an accounting group as an entity within an organization that is allowed to share the item.

The item may be accessed through a storage service 124 through a network 120. The storage service 124 may store the item in a data store 126. The item may include a document, a video file, an audio file, an image, a graphic, an animation, an email, a message, a meeting note, a data store, and a presentation, among others. The storage service 124 may be provided through a remote network or a local network in relation to the computing device 104.

The sharer 102 may initiate a sharing action to transmit the link for sharing item 106 to a computing device 122 of the recipient 112 to share the item. The computing device 122 may be a mobile device such as a smart phone or a notebook computer, among others. A received link 116 may be used by the recipient 112 to access the item. Search & discovery 114 access to the item may be determined by the access control list. If the recipient is in the access control list, the item may be searchable and discoverable by the recipient. Open/edit 118 access to the item may be determined by the information boundary 110. The information boundary 110 may include rules to define the access privileges granted to the recipient 112.

Figure 2:
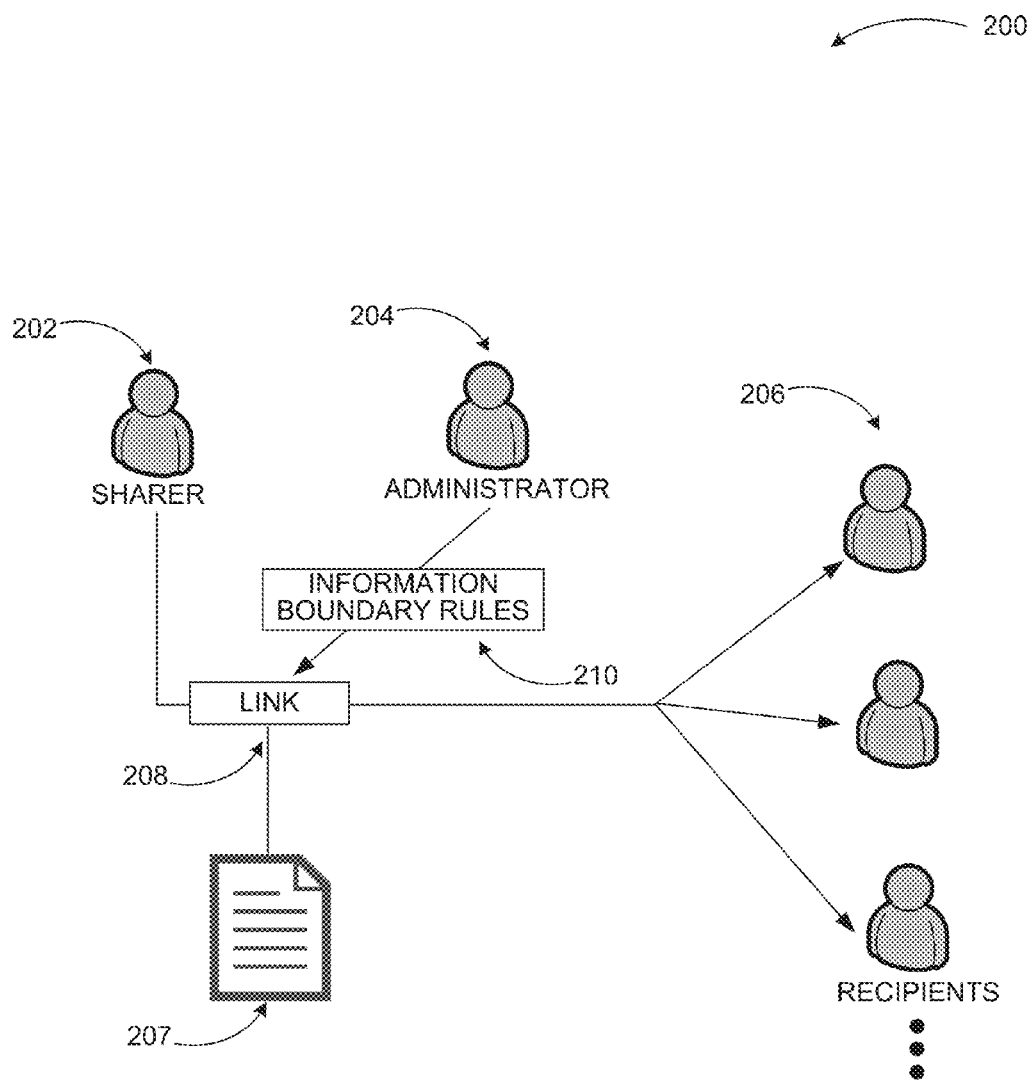
FIG. 2 illustrates conceptually sharing of items based on information boundary settings.

FIG. 2 illustrates conceptually sharing of items based on information boundary settings. As shown in a diagram 200, an application such as an item management application may manage sharing of an item 207. An example of an item management application may include a document management application. The item 207 may be shared by a sharer 202 through a link 208 that is transmitted to recipients 206. The sharer may select information boundary rules 210 to manage the sharing of the item 207. The information boundary rules may be defined by an administrator 204.

The information boundary rules 210 as selected by the sharer 202 may define the information boundary of sharing the item 207. In an example scenario, the sharer 202 may select access rules such as read access, write access, and an execute access, among others to define the information boundary of the item 207. The sharer 202 may select a read access rule as one of the information boundary rules to allow the recipients 206 to read the item 207 while preventing the recipients 206 to edit or delete the item 207. Alternatively, the sharer 202 may select a write access rule as one of the information boundary rules 210 to allow the recipients to edit the item 207. In another example scenario, the sharer 202 may select information boundary rules 210 to limit number of subsequent shares that one of the recipients 206 may attempt with another set of recipients. In yet another example scenario, the sharer 202 may select information boundary rules 210 that identify a group such as accounting, engineering, design, among others within an organization as the recipients 206 who are granted access to the item 207.

An access control list may identify the recipients who are granted search and discovery access to the item 207. However, the sharer may share the item with recipients 206 who are not in the access control list. In such a scenario, if the recipient receives the link 208 and attempts to search or discover the item 207, the recipient may be unable to locate the item 207 because the item 207 may be in an invisible state to the recipients 206. To make the item 207 searchable and discoverable the recipients 206 (who are not in the access control list) may access the item 207 through the link 208. In response to the recipients 206 attempt to access the item 207, the item management application may add the recipients 206 into the access control list and make the item 207 searchable and discoverable to the recipients 206. As such, the access control list may define a recipient's ability to search and discover the item 207. If the recipient is in the access control list, the recipient may be allowed to search and discover the item 207. However, if the recipient is not in the access control list but is allowed to access the document through the information boundary as set by the sharer 202, the recipient may be added to the access control list in response to an attempt to access the item 207. The attempt to access the item 207 may include activation of the link 208, among other schemes.

The administrator 204 may be provided with a user interface to create and manage a recipient data store to allow the sharer 202 to create the access control list. The administrator 204 may add or delete recipients 206 to the recipient data store. The sharer 202 may define the recipients 206 by generating the access control list that includes the recipients 206. Alternatively, the sharer 202 may select an access control list that is generated by the administrator or a user management system from a set of access control lists. Examples include organizational access lists such as users in a building, users in a group, users in a room, and users in a role, among others.

The administrator 204 may also be provided with a user interface to create and manage the information boundary rules 210. The sharer 202 may select a set of rules from the information boundary rules 210 to define the information boundary. The sharer 202 may also be granted privileges to modify the information boundary rules 210 or create new rules. The sharer 202 may configure settings of a selected subset of the information boundary rules 210. In an example scenario, the sharer 202 may select a group within an organization such as an accounting group. The sharer 202 may grant the group with a read access to share the item 207 to define the information boundary associated with the item 207. The recipients 206 within the accounting group may share the item 207 with read access amongst each other without further action from the sharer 202. The administrator 204 may also be allowed to generate and modify default information boundary rules. The default information boundary rules may include strict rules to prevent unauthorized dissemination of information. Examples may include a rule to limit access to an item to recipients within an organization and a rule to provide read only access to the item. Moreover, different users in an organization may be given default information boundaries. For example, people in the Finance group might have the default information boundary of "Anyone in Finance can open the files I create." People who work in particularly sensitive areas—e.g. Legal—may be assigned the most restrictive information boundary, which may be "Only people I add to the access control list manually can see my files."

Figure 3:
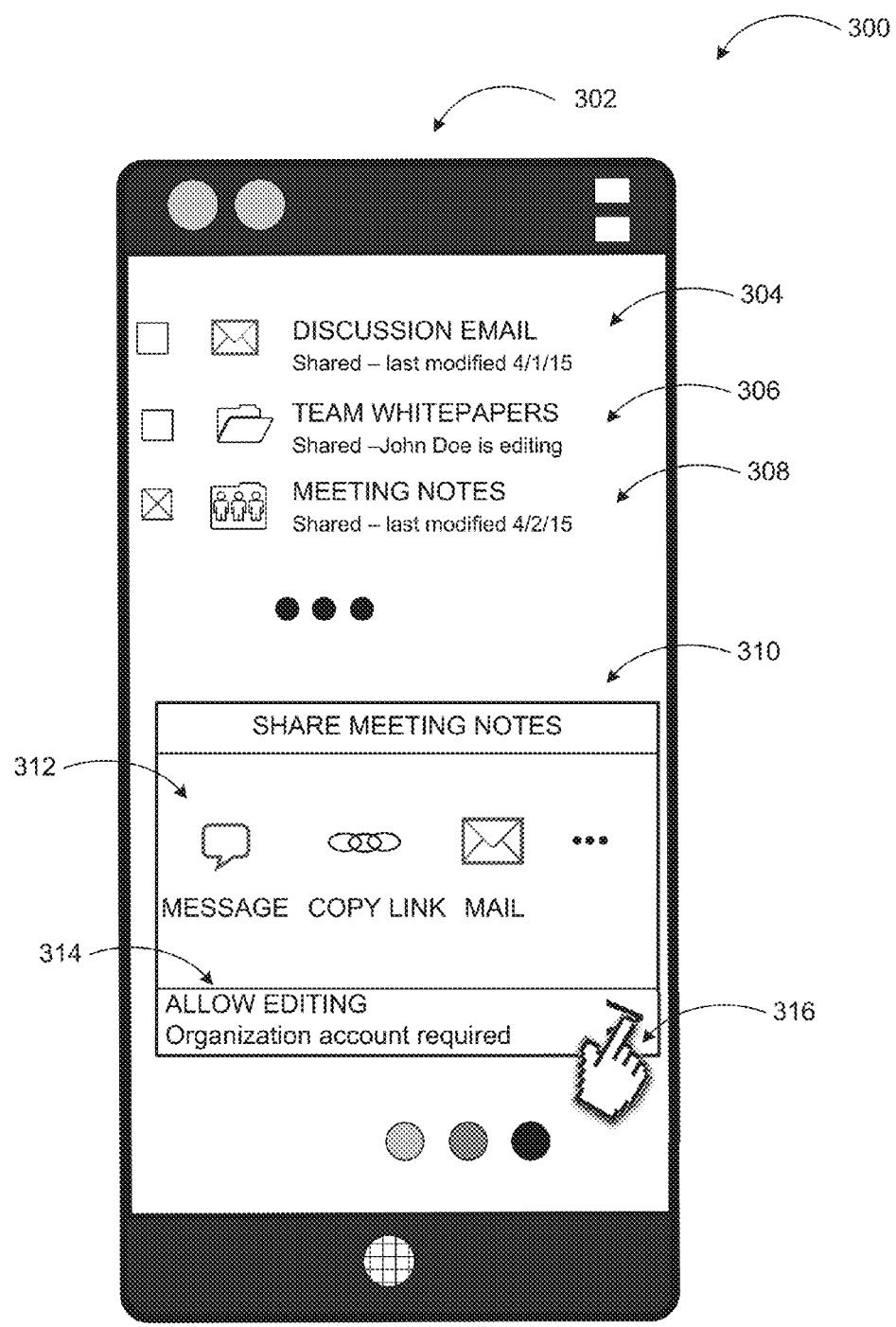
FIG. 3 illustrates an example user experience to allow a sharer to share an item with the option of defining information boundary and/or access control settings.

FIG. 3 illustrates an example user experience to allow a sharer to share an item with the option of defining information boundary and/or access control settings. As illustrated in a diagram 300, a computing device 302 may display an example user interface of an item management application. The computing device 302 may include a smart phone, among others. The user interface of the item management application may include a client interface for the item management application that executes in a remote computing device, or a local user interface for the item management application that executes locally, among others.

The user interface of the item management application may display items such as an email 304, a document 306, and a meeting note 308, among others. The user interface may also display a sharing status of the items. In an example scenario, the email 304 may be displayed with a share status and a last edit status. The document 306 may be displayed with a share status and a present editing status that includes the recipient who is editing the document 306. The meeting notes 308 may be displayed with a share status and a last edit status. The last edit status may include a timestamp of the last edit.

A share user interface component 310 may provide the sharer with controls to share the items 312 such as the email 304, the document 306, and the meeting note 308, among others. The sharer may be able to copy the items 312 into the share user interface component 310 to initiate a share process. An example of a copy operation includes a drag and drop action. The sharer may also be allowed to select information boundary rules from a rule user interface component 314. In an example scenario the sharer may be allowed to select an access rule such as grant edit privileges and an organizational rule such as an organization account requirement from the list of rules. The list of rules associated with the information boundary may be defined by an administrator of the rules. The administrator may also grant edit and create privileges to allow the sharer to edit existing rules and create new rules. The sharer may be allowed to configure the information boundary and an access control list associated with the item by selecting an activation control 316.

Figure 4:
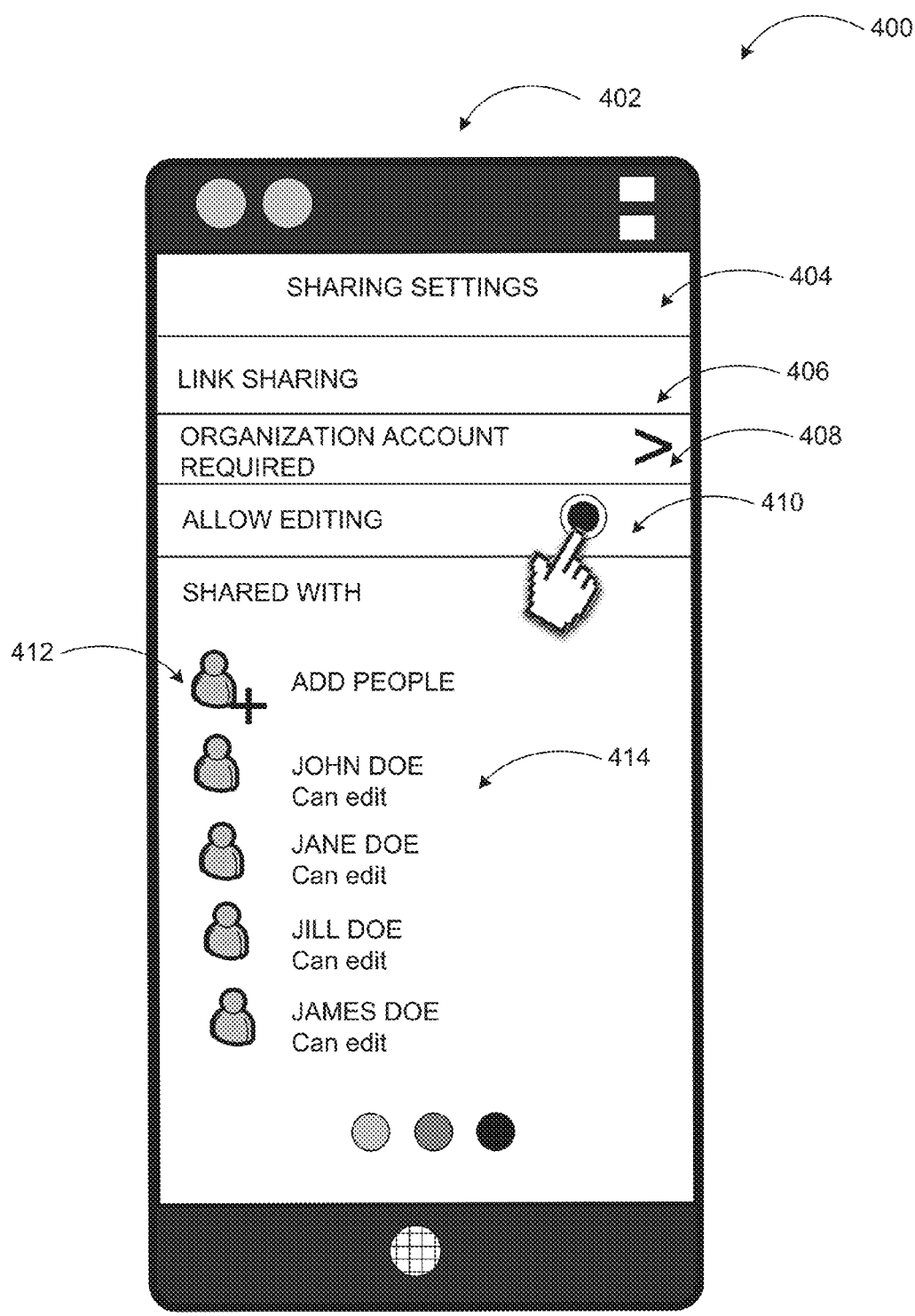
FIG. 4 illustrates another example user experience to allow a sharer to see and define information boundary and/or access control settings for a shared item.

FIG. 4 illustrates another example user experience to allow a sharer to see and define information boundary and/or access control settings for a shared item. As illustrated in diagram 400, a computing device 402 may provide a sharing user interface 404 of an item management application. The sharing user interface 404 may allow the sharer to configure rules associated with the information boundary of an item to be shared. A link sharing control 406 may allow the sharer to share the item. The sharer may transmit the link to a recipient who may be allowed to access the item. An activation of the organization account required control 408 may process a rule that determines whether the recipient has an organization account such as an email address that is associated with the organization. In response to a detection of the organization account, the recipient may be allowed to share the item. An access control 410 may set an access privilege of the recipient. The recipient may be allowed to read, edit, execute, and perform other actions associated with the item.

The sharer may also be allowed to specify an access control list 414 through a shared user interface component of the sharing user interface 404. The sharer may be allowed to add recipients to share the item through an add recipient control 412. Recipients may be added, modified, or deleted from the access control list to define who has access to the item. An access status of each recipient may also be displayed to remind the user of the shared privileges with the recipients. The recipients may be provided by an administrator through an recipient data store. The recipients in the access control list 414 may be allowed to search and discover the item.

Figure 5:
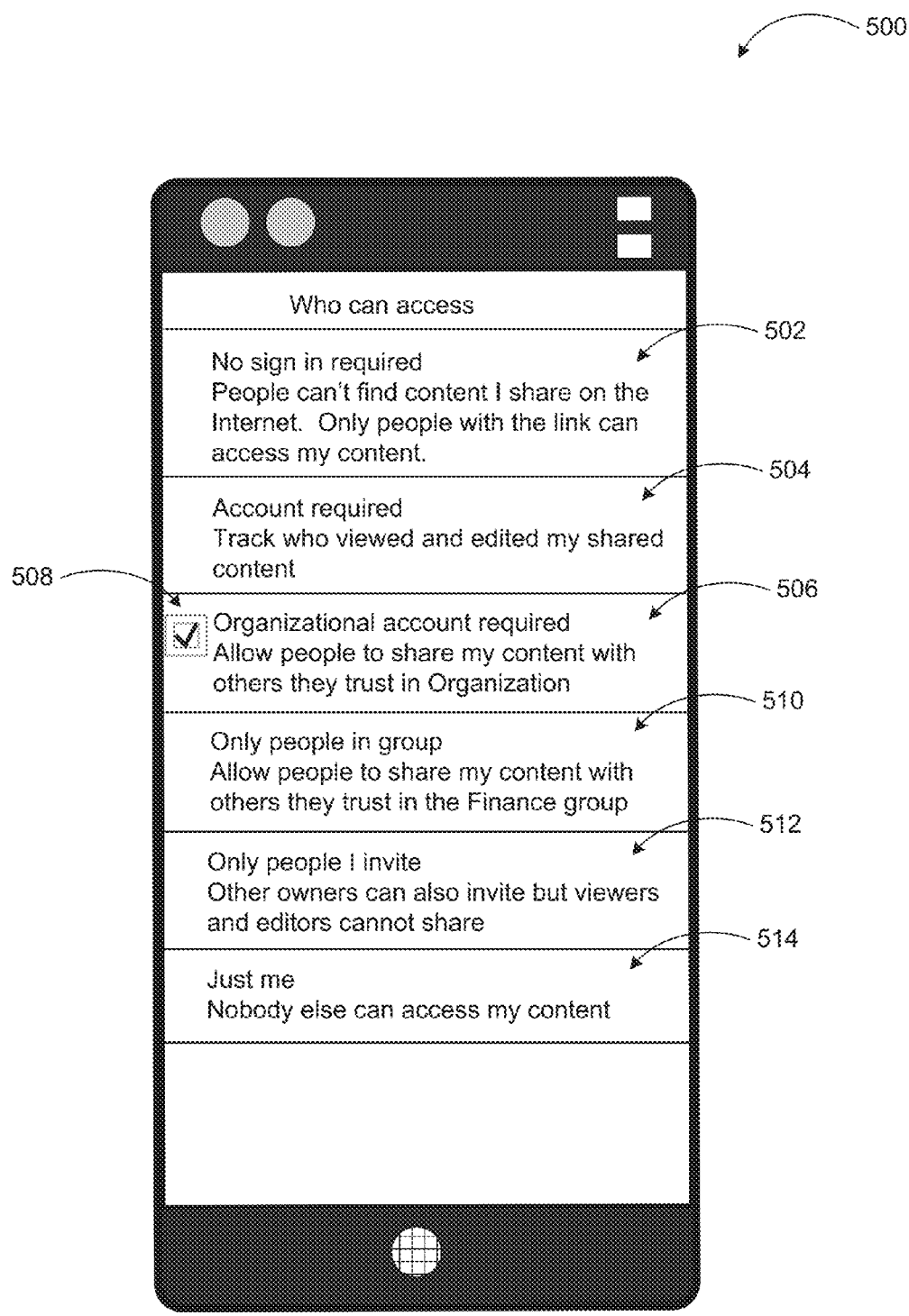
FIG. 5 illustrates a further example user experience to allow a sharer to view access attributes for groups within an organization (information boundaries)

FIG. 5 illustrates a further example user experience to allow a sharer to view access attributes for groups within an organization (information boundaries). As illustrated in diagram 500, a user interface of an item management application may be provided to the sharer to allow the sharer to select rules associated with the information boundary. In an example scenario, information boundary rules available to the sharer may be displayed by the user interface. The information boundary rules may vary in restrictions applied to sharing the item. The rules may be listed in a sorted format such as a most restrictive rule to a least restrictive rule or least restrictive rule to a most restrictive rule, among others.

In an example scenario, a no sign in required rule 502 may be displayed to allow the sharer to select the rule as the information boundary. The no sign in required rule 502 may restrict sharing of the item to recipients with whom the sharer transmits the link to the item. Others may not be allowed to search or discover the item. An account required rule 504 may restrict the sharing of the item to recipients who have an account as specified by the sharer. The account may be an email account associated with the recipient such as an email associated with a domain address of the organization. The organization account required rule 506 may restrict sharing of the item to recipients who have an organization account. The organization account may be in common with the sharer. Alternatively, the sharer may specify the organization account that may not be in common with the sharer. The sharer may select a rule to define the information boundary through a user action 508 such as a tap action, among others.

In another example scenario, an only people in group rule 510 may restrict sharing of the item to recipients within a group. The group may be defined by an administrator within an access control list that the sharer may be allowed to select. Alternatively, the sharer may be allowed to create the group by generating an access control list associated with the group. The recipients in the group may be allowed to share the item with other recipients in the group based on an access rule as set by the sharer. The only people I invite rule 512 may restrict sharing of the item to the recipients as specified by the sharer in an access control list. The recipients in the access control list may not be allowed to share the item with other recipients outside the access control list. The just me rule 514 restricts the item to the sharer. The item may not be shared with recipients regardless of a link to the item.

The examples in FIGS. 1 through 5 have been described using specific network environments, systems, services, applications and processes to share an item based on information boundary and access control list settings. Embodiments to share an item based on information boundary and access control list settings are not limited to the specific network environments, systems, services, applications, and processes according to these examples.

Sharing an item based on information boundary and access control list settings, as described in the embodiments above, may eliminate additional user selection steps, advantageously reducing processor load and thus increasing a processing speed. Additionally, sharing an item based on information boundary and access control list settings may eliminate the inconvenience of multiple user authentication steps to receive authentication to access an item in a secure environment. Furthermore, the information boundary and access control list may enhance availability, along with allowing the sharer to set permission levels for each recipient and item.

Figure 6:
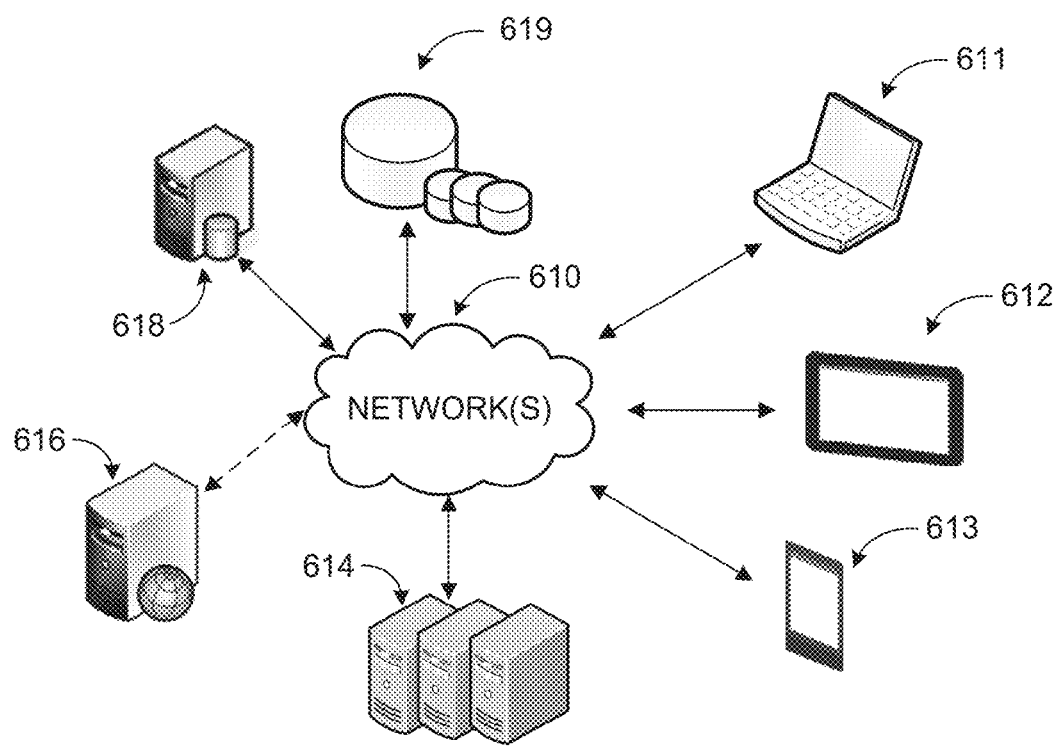
FIG. 6 is a simplified networked environment, where a system according to embodiments may be implemented.

FIG. 6 is an example networked environment, where embodiments may be implemented. An item management application configured to share an item based on information boundary and access control list settings may be implemented via software executed over one or more servers 614 such as a hosted service. The platform may communicate with client applications on individual computing devices such as a smart phone 613, a mobile computer 612, or desktop computer 611 ('client devices') through network(s) 610.

Client applications executed on any of the client devices 611-613 may facilitate communications via application(s) executed by servers 614, or on individual server 616. An item management application may detect selections of an information boundary to manage a sharing action associated with an item and an access control list to manage recipients who have an access to the item. In response to a detection of the sharing action to share the item, the information boundary and the access control list may be applied to the item. The item may be shared based on the information boundary and the access control list. The item management application may store the item in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to share an item based on information boundary and access control settings. Furthermore, the networked environments discussed in FIG. 6 are for illustration purposes only. Embodiments are not limited to the example applications, modules, or processes.

Figure 7:
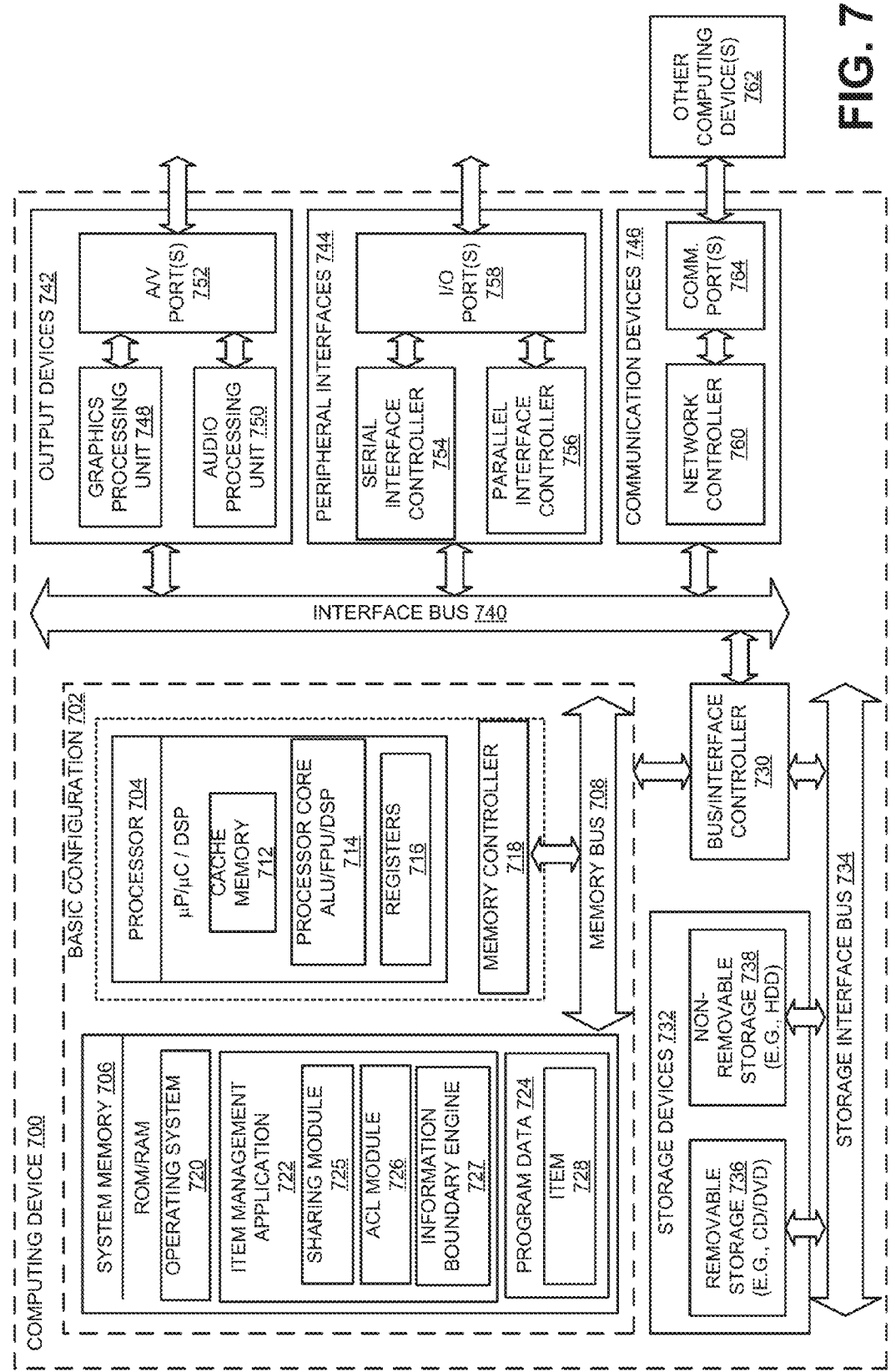
FIG. 7 is a block diagram of an example computing device, which may be used to implement item sharing based on information boundary and access control list settings.

FIG. 7 and the associated discussion are intended to provide a brief, general description of a general purpose computing device, which may be used to implement item sharing based on information boundary and access control list settings.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, an item management application 722, and program data 724. The management application 722 may include a sharing module 725 to manage operations associated with sharing the item through a link the item, an access control list (ACL) module 726 may manage operations to generate and modify an access control list, and an information boundary engine may generate and modify an information boundary from rules that are selected by a sharer, which may be integrated modules of the item management application 722 or separate applications. The program data 724 may include, among other data, an item 728 that may be shared through a link of the item based on information boundary and access control list settings, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to share an item based on information boundary and access control list settings. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
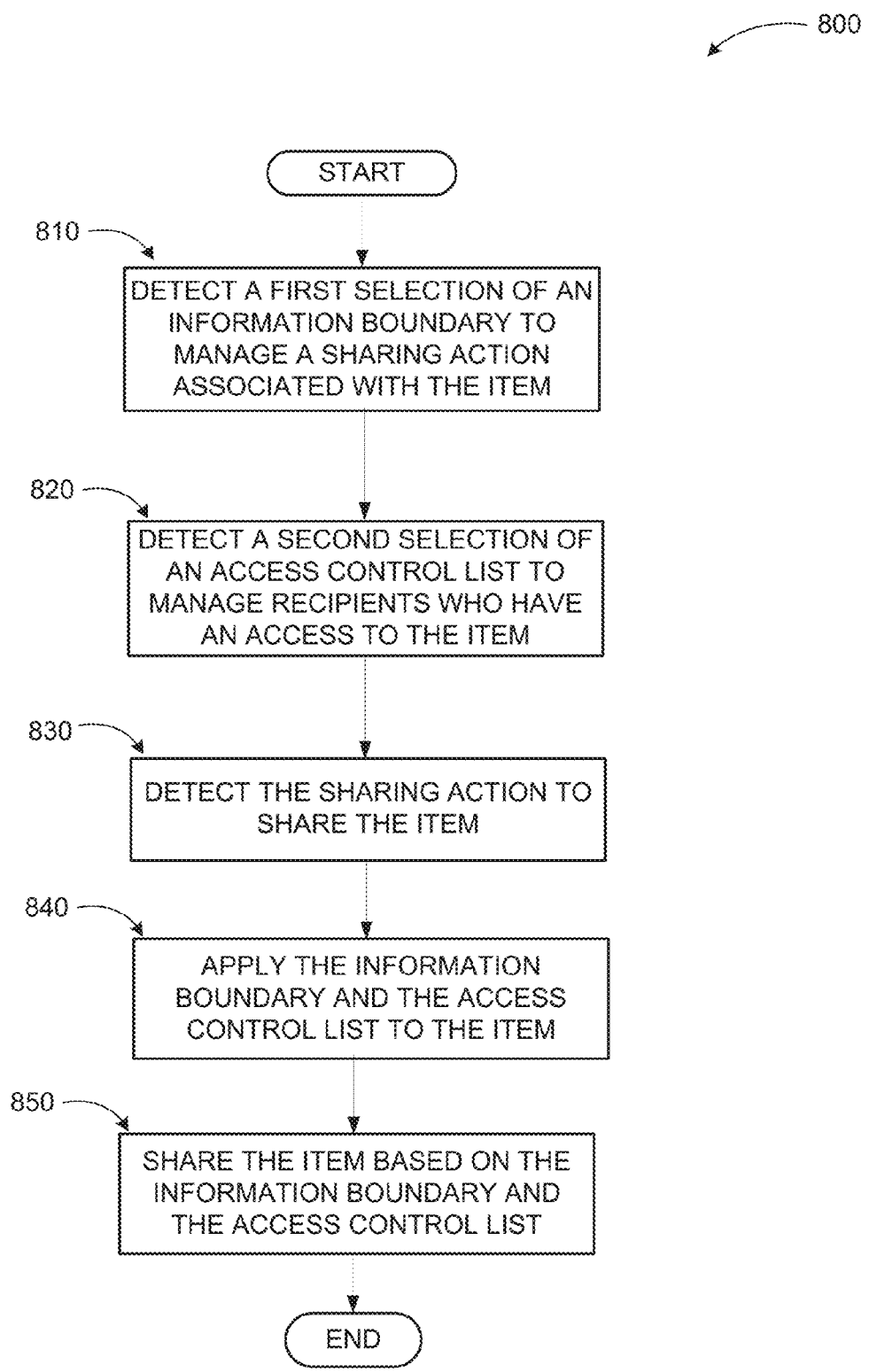
FIG. 8 illustrates a logic flow diagram of a method to enable item sharing based on information boundary and access control list settings, according to embodiments.

FIG. 8 illustrates a logic flow diagram of a method to enable item sharing based on information boundary and access control list settings, according to embodiments. Process 800 may be implemented on a computing device such as the computing device 700 or other system.

Process 800 begins with operation 810, where a selection of an information boundary may be detected to manage a sharing action associated with the item. The information boundary may include rules such as access rules to govern an access of a recipient to the item. At operation 820, a selection of an access control list may be detected to manage recipients who have an access to the item. The access control list may govern search and discovery availability of the item. The recipients in the access control list associated with the item may search and discover the item. The recipients who are not in the in the access control list may not discover the item through a search.

A sharing action to share the item may be detected at operation 830. The sharing action may include a command by the sharer to transmit a link of the item to a recipient. The recipient may or may not be in an access control list associated with the item. The information boundary and the access control list may be applied to the item at operation 840. The item may be shared based on the information boundary and the access control list at operation 850. The information boundary may provide rules to determine how the item may be accessed by the recipient. The access control list may allow the recipient to search and discover the item.

The operations included in process 800 are for illustration purposes. Sharing an item based on information boundary and access control listings may be implemented by similar processes with fewer or additional steps, as well as in different order of operations using the principles described herein.

According to other examples, a means for employing context-based inference to share an item based on information boundary and access control list settings is described. The means may include a means for detecting a first selection of an information boundary to manage a sharing action associated with the item, where the information boundary includes one or more access rules associated with the item; a means for detecting a second selection of an access control list to manage recipients who have an access to the item; a means for detecting the sharing action to share the item; a means for applying the information boundary and the access control list to the item; and a means for sharing the item based on the information boundary and the access control list.

According to some examples, a computing device configured to share an item based on information boundary and access control list settings is described. The computing device may include a memory configured to store one or more instructions and a processor coupled to the memory and configured to execute an item management application. The item management application may be configured to detect a first selection of an information boundary to manage a sharing action associated with the item; detect a second selection of an access control list to manage recipients who have an access to the item; detect the sharing action to share the item; apply the information boundary and the access control list to the item; and share the item based on the information boundary and the access control list.

According to other examples, the item management application may be further configured to in response to a detection of a creation of the item, assign default information boundaries to the item and provide a user interface to allow an administrator of the default information boundaries to one or more of create and manage one or more rules of the default information boundaries. The item management application may also be configured to identify a new recipient in the sharing action; in response to a detection of the new recipient in the access control list, determine whether the new recipient is within the information boundary of the item; and in response to a detection that the new recipient is within the information boundary of the item, grant the new recipient an access to the item.

According to further examples, the item management application may be further configured to identify a new recipient in the sharing action; in response to a failure to detect the new recipient in the access control list, determine whether the new recipient is within the information boundary of the item; and in response to a detection that new recipient is within the information boundary of the item, grant the new recipient an access to the item and add the new recipient to the access control list. The item management application may also be configured to allow a sharer of the item to select the information boundary from a number of information boundaries, where the number of information boundaries include one or more access rules associated with the item.

According to yet other examples, the item management application may be further configured to allow the sharer to manage the one or more access rules, where the one or more access rules include one or more of a read access rule, a write access rule, and an execute access rule. The item management application may also be configured to receive organizational instructions to store the recipients in groups; and add the groups to the access control list. The item management application may be further configured to detect a third selection of a group to grant the group an access to the item, where the group includes a subset of the recipients; and add one or more rules to the information boundary to grant the group the access to the item. The item management application may be further configured to provide a user interface to allow an administrator of the information boundary to define the group and the access, wherein the access includes one or more of a read access, a write access, and an execute access to the item or provide a user interface to allow a sharer of the item to edit the group and the access, wherein the access includes one or more of a read access, a write access, and an execute access to the item.

According to other examples, a method to employ context-based inference to share an item based on information boundary and access control list settings is described. The method may include detecting a first selection of an information boundary to manage a sharing action associated with the item, where the information boundary includes one or more access rules associated with the item; detecting a second selection of an access control list to manage recipients who have an access to the item; detecting the sharing action to share the item; applying the information boundary and the access control list to the item; and sharing the item based on the information boundary and the access control list.

According to further examples, the method may also include transmitting a link to the item to a selected recipient of the recipients in response to the sharing action; detecting an execution of a first search for the item by the selected recipient; and maintaining an invisible status of the item to the first search. The method may further include detecting an access to the item through the link by the selected recipient; and adding the recipient to the access control list. The method may also include detecting an execution of a second search for the item by the selected recipient; and providing the item within a results list for the second search. The method may further include allowing an administrator of the information boundary to define a number of information boundaries to a sharer of the item for the first selection; and allowing the administrator of the access control list to define the recipients to the sharer of the item for the second selection.

According to yet further examples, a computer-readable memory device with instructions stored thereon to share an item based on information boundary and access control list settings is described. The instructions may include detecting a first selection of an information boundary to manage a sharing action associated with the item, where the information boundary includes one or more access rules associated with the item; detecting a second selection of an access control list to manage recipients who have an access to the item; detecting the sharing action to share the item; applying the information boundary and the access control list to the item; and sharing the item based on the information boundary and the access control list.

According to some examples, the instructions may further include transmitting a link to the item to a selected recipient from the recipients in response to the sharing action; detecting an execution of a first search for the item by the selected recipient; and maintaining an invisible status of the item to the first search. The instructions may also include providing a link to the item based on the sharing action to a selected recipient of the recipients; detecting an access to the item through the link by the selected recipient; adding the recipient to the access control list; detecting an execution of a second search for the item by the selected recipient; and providing the item within a results list for the second search.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device configured to share an item based on information boundary and access control list settings, the computing device comprising:
   a memory configured to store one or more instructions; and
   a processor coupled to the memory and configured to execute an item management application, wherein the item management application is configured to:
      detect a first selection of an information boundary to manage a sharing action associated with the item;
      provide a user interface of the item management application to enable selection of one or more access rules associated with the information boundary to define the information boundary, wherein the one or more access rules are displayed through the user interface in a sorted format from a most restrictive access rule to a least restrictive access rule;
      detect a second selection of an access control list to manage recipients who have an access to the item;
      detect the sharing action to share the item;
      apply the information boundary and the access control list to the item;
      share the item based on the information boundary and the access control list by transmitting a link to the item to the recipients in the access control list; and
      in response to a determination that the link was transmitted to an additional recipient that is not in the access control list:
         detect an attempt by the additional recipient to access the item through the link;
         determine whether the additional recipient is allowed to access the item based on the information boundary; and
         in response to a determination that the additional recipient is allowed to access the item based on the information boundary, add the additional recipient to the access control list such that the additional recipient is enabled to search and discover the item through a user interface of the item management application.

2. The computing device of claim 1, wherein the item management application is further configured to:
   in response to a detection of a creation of the item, assign default information boundaries to the item.

3. The computing device of claim 2, wherein the item management application is further configured to:
   provide a user interface to allow an administrator of the default information boundaries to one or more of create and manage one or more rules of the default information boundaries.

4. The computing device of claim 1, wherein the item management application is further configured to:
   identify a new recipient in the sharing action;
   in response to a detection of the new recipient in the access control list, determine whether the new recipient is within the information boundary of the item; and
   in response to a detection that the new recipient is within the information boundary of the item, grant the new recipient an access to the item.

5. The computing device of claim 1, wherein the item management application is further configured to:
   identify a new recipient in the sharing action;
   in response to a failure to detect the new recipient in the access control list, determine whether the new recipient is within the information boundary of the item; and in response to a detection that new recipient is within the information boundary of the item, grant the new recipient an access to the item and add the new recipient to the access control list.

6. The computing device of claim 1, wherein the item management application is further configured to:
allow a sharer of the item to select the information boundary from a number of information boundaries, wherein the number of information boundaries include one or more access rules associated with the item.

7. The computing device of claim 6, wherein the item management application is further configured to:
allow the sharer to manage the one or more access rules, wherein the one or more access rules include one or more of a read access rule, a write access rule, and an execute access rule.

8. The computing device of claim 1, wherein the item management application is further configured to:
receive organizational instructions to store the recipients in groups; and
add the groups to the access control list.

9. The computing device of claim 1, wherein the item management application is further configured to:
detect a third selection of a group to grant the group an access to the item, wherein the group includes a subset of the recipients; and
add one or more rules to the information boundary to grant the group the access to the item.

10. The computing device of claim 9, wherein the item management application is further configured to:
provide a user interface to allow an administrator of the information boundary to define the group and the access, wherein the access includes one or more of a read access, a write access, and an execute access to the item.

11. The computing device of claim 9, wherein the item management application is further configured to:
provide a user interface to allow a sharer of the item to edit the group and the access, wherein the access includes one or more of a read access, a write access, and an execute access to the item.

12. A method to employ context-based inference to share an item based on information boundary and access control list settings, the method comprising:
detecting a first selection of an information boundary to manage a sharing action associated with the item, wherein the information boundary includes one or more access rules associated with the item;
providing a user interface of an item management application to enable selection of one or more access rules associated with the information boundary to define the information boundary, wherein the one or more access rules are displayed through the user interface in a sorted format from a most restrictive access rule to a least restrictive access rule;
detecting a second selection of an access control list to manage recipients who have an access to the item;
detecting the sharing action to share the item;
applying the information boundary and the access control list to the item;
sharing the item based on the information boundary and the access control list by transmitting a link to the item to a selected recipient that is in the access control list; and
in response to a determination that the link was transmitted to an additional recipient that is not in the access control list:
detecting an attempt by the additional recipient to access the item through the link;
determining whether the additional recipient is allowed to access the item based on the information boundary; and
in response to a determination that the additional recipient is allowed to access the item based on the information boundary, adding the additional recipient to the access control list such that the additional recipient is enabled to search and discover the item through a user interface of the item management application.

13. The method of claim 12, further comprising:
detecting an execution of a search for the item by the selected recipient; and
maintaining an invisible status of the item to the search.

14. The method of claim 13, further comprising:
detecting an access to the item through the link by the selected recipient.

15. The method of claim 14, further comprising:
detecting an execution of another search for the item by the selected recipient; and
providing the item within a results list for the other search.

16. The method of claim 12, further comprising:
allowing an administrator of the information boundary to define a number of information boundaries to a sharer of the item for the first selection; and
allowing the administrator of the access control list to define the recipients to the sharer of the item for the second selection.

17. A computer-readable memory device with instructions stored thereon to share an item based on information boundary and access control list settings, the instructions comprising:
detecting a first selection of an information boundary to manage a sharing action associated with the item, wherein the information boundary includes one or more access rules associated with the item;
providing a user interface of an item management application to enable selection of at least one of the one or more access rules to define the information boundary, wherein the one or more access rules are displayed through the user interface in a sorted format from a most restrictive access rule to a least access restrictive rule;
detecting a second selection of an access control list to manage recipients who have an access to the item;
detecting the sharing action to share the item;
applying the information boundary and the access control list to the item;
sharing the item based on the information boundary and the access control list by transmitting a link to the item to a selected recipient that is in the access control list; and
in response to a determination that the link was transmitted to an additional recipient that is not in the access control list:
detecting an attempt by the additional recipient to access the item through the link;
determining whether the additional recipient is allowed to access the item based on the information boundary; and
in response to a determination that the additional recipient is allowed to access the item based on the information boundary, adding the additional recipient to the access control list such that the additional recipient is enabled to search and discover the item through a user interface of the item management application.

18. The computer-readable memory device of claim 17, wherein the instructions further comprise:

detecting an execution of a search for the item by the selected recipient; and maintaining an invisible status of the item to the search.

19. The computer-readable memory device of claim 18, wherein the instructions further comprise:

detecting an execution of another search for the item by the selected recipient; and providing the item within a results list for the other search.

\* \* \* \* \*